United States Patent [19]

Childers et al.

[11] 4,323,284
[45] Apr. 6, 1982

[54] THRUST FACE BEARING STRUCTURE FOR ROLLING CUTTER DRILL BIT

[75] Inventors: John S. Childers; Terry H. Mayo, both of Houston, Tex.

[73] Assignee: Reed Rock Bit Company, Houston, Tex.

[21] Appl. No.: 197,835

[22] Filed: Oct. 17, 1980

[51] Int. Cl.³ .............................................. F16C 17/12
[52] U.S. Cl. ................................. 308/8.2; 308/DIG. 8
[58] Field of Search .......... 308/8.2, DIG. 8, DIG. 9, 308/160, 163; 175/371, 372

[56] References Cited

U.S. PATENT DOCUMENTS

| 4,210,371 | 7/1980 | Gerkema et al. | 308/DIG. 8 |
| 4,220,377 | 9/1980 | Phelps | 308/8.2 |
| 4,232,912 | 11/1980 | Williamson | 308/DIG. 8 |
| 4,260,203 | 4/1981 | Garner | 308/DIG. 8 |

*Primary Examiner*—Lenard A. Footland
*Attorney, Agent, or Firm*—Michael J. Caddell

[57] ABSTRACT

A rolling cutter drill bit is disclosed having an improved thrust face bearing structure which utilizes alternating segments of at least two different bearing metals. The composite thrust face bearing structure disclosed has a first metal selected for a low temperature operation, and at least one additional metal selected for high temperature operation.

6 Claims, 3 Drawing Figures

THRUST FACE BEARING STRUCTURE FOR ROLLING CUTTER DRILL BIT

BACKGROUND OF THE INVENTION

The present invention generally relates to rolling cutter drill bits of the type having cantilevered bearing shafts upon which are rotatably mounted generally frustoconical cutter bodies having cutting teeth or inserts protruding outwardly therefrom. More specifically, the present invention discloses a composite bearing structure for use in the thrust face area of a rolling cutter drill bit cutting assembly, which composite bearing structure exhibits improved characteristics of wear resistance in high temperature operations and greater resistance to early bearing failure. Conventional rolling cutter drill bits generally utilize at least two different bearing systems to rotatably mount the cutting structures on the bearing shafts. The first such system is the radial bearing system generally comprising ball bearings, roller bearings and/or friction sleeve bearings. These bearing structures absorb the thrust loads in the radial direction with respect to the cylindrical bearing shaft. The second type of bearing system found in rolling cutter bits is the thrust bearing or thrust face bearing system, which generally contributes to the rotatability of the cutter on the cutter shaft and is subjected to thrust loads which occur generally in the axial direction with respect to the bearing shaft. The present invention is directed to improved configurations for the thrust bearing system of the rolling cutter drill bit. This invention discloses a composite segmented thrust bearing structure having alternating segments of different metallic bearing materials with one bearing material being selected for low temperature operability, and the alternate material being selected for high temperature operability.

DESCRIPTION OF THE PREFERRED EMBODIMENTS

Figure 1:
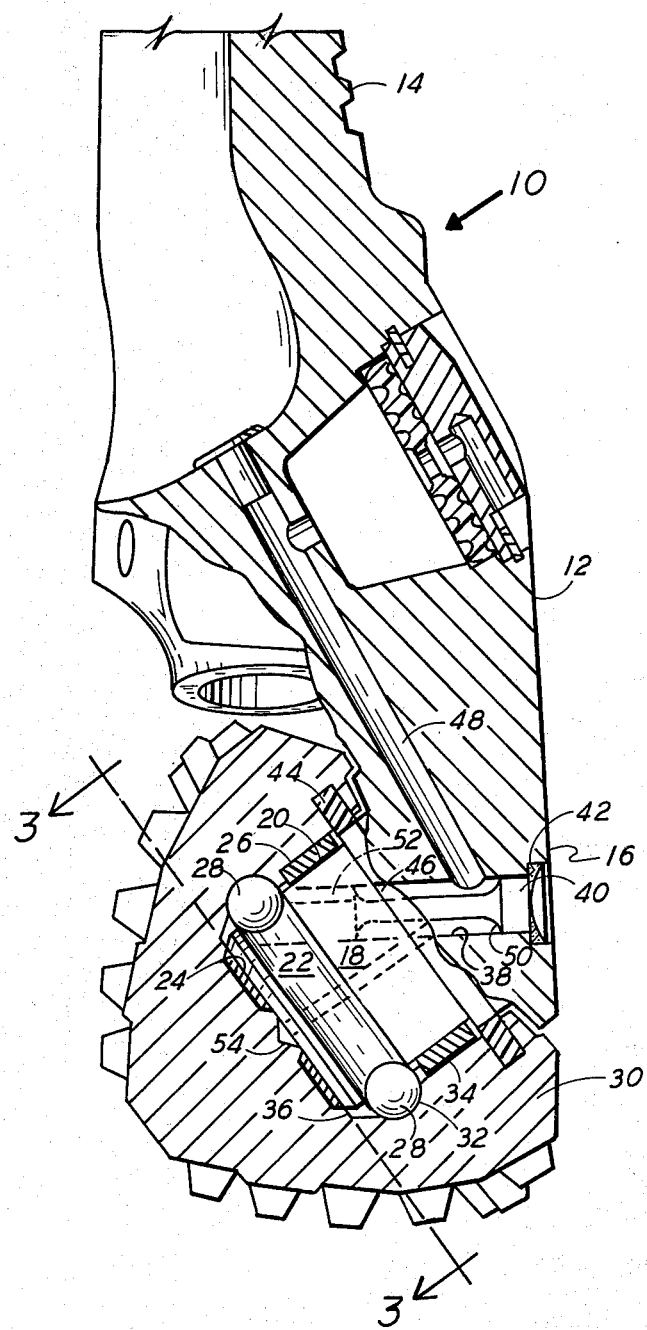
FIG. 1 is a cross-sectional view of a single lug member with cutting structure from a tri-cone rolling cutter drill bit.

Referring now to FIG. 1, which is a typical representation of one lug assembly in a tri-cone rock bit, the lug assembly 10 comprises a downwardly extended leg section 12 and an upper threaded pin end 14. It should be noted that the typical lug assembly 10 generally comprises an arcuate section of about 120 arc degrees, which is one-third of a complete rock bit. The lug assembly 10 has a downwardly extending bearing journal 18 integrally formed on the lower end 16 of lug 12. A cylindrical bearing surface 20 is formed on journal 18, and a circular ball race 22 is also formed on the shaft. A flat thrust face 24 is located across the lower end of bearing shaft 18. A cylindrical friction bearing 26 is located in relatively close-fitting relationship on bearing surface 20. A plurality of spherical ball bearings 28 are located in race 22. A generally frusto-conical rolling cutter 30 is rotatably mounted on shaft 18 and retained thereon by the provision of ball bearings 28. Cutter 30 has a complementary circular ball race 32 formed to receive ball bearings 28. Likewise, a recessed sleeve bearing surface 34 is formed in cutter 30 for tight-fitting engagement with friction sleeve 26. A thrust bearing surface 34 is formed in the cavity of cutter 30 for rotative bearing engagement with thrust end 24 of shaft 18.

A ball bearing loading channel 38 is formed through lug 16 for the placement of ball bearings in race 22. A plug member 40 seals channel 38 after loading of the ball bearings. Plug member 40 may be welded into position as shown at 42. A radial seal member 44 is located in a radial seal recess in cutter 30 for sealing engagement on sealing shoulder 46 machined on bearing journal 18. A lubricant passage 48 is formed through lug 12 for supplying a lubricant into the bearing areas between the cutter 30 and the journal 18.

Figure 2:
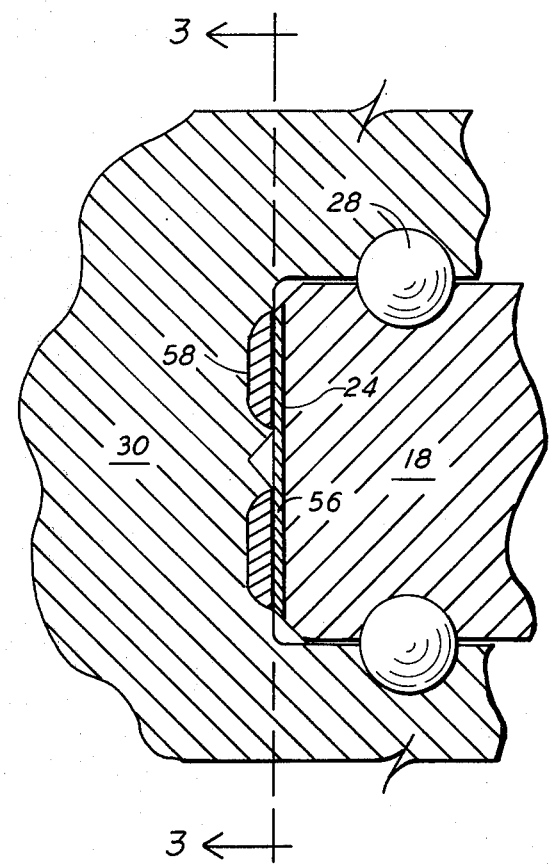
FIG. 2 is a broken-out, enlarged, cross-sectional view of the thrust bearing surface area of the cutting structure in the drill bit of FIG. 1.

Referring now to FIG. 2, a blown-up, cross-sectional illustration of a portion of the bearing journal 18 and cutter 30 is disclosed. This broken-out, cross-sectional area more clearly illustrates the thrust bearing structure between the journal and the cutter. In the figure, the journal shaft 18 has a relatively flat, perpendicular thrust face 24 with a layer of bearing material 56 bonded thereto. The thrust face 24 is substantially normal to the center line of bearing shaft 18 and substantially covers the entire diameter of the shaft. Cutter 30 has a complementary bearing structure 58 adjacent to journal bearing layer 56 and arranged for sliding contact therewith. The cutter thrust bearing material 58 is bonded or fused to the cutter thrust face in recesses which have been formed in the cutter thrust face.

Figure 3:
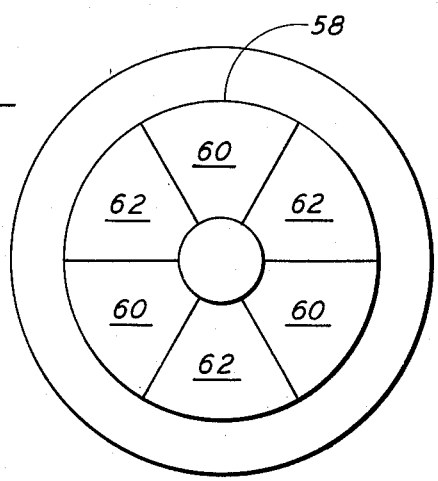
FIG. 3 is a radial view of the bearing structure in the cutter taken at 90 degrees from FIG. 2.

FIG. 3 is a radial view of the cutter thrust face bearing area taken at line 3—3 of FIG. 2. In FIG. 3, the cutter thrust bearing assembly 58 comprises a set of alternating bearing segments 60 and 62. These alternating bearing segments are made of metallic bearing materials having widely varying characteristics. For example, in one embodiment of the invention, one set of segments 60 was formed of a bearing material comprising an aluminum-bronze alloy consisting of about 14 to 15 percent by weight of aluminum, about 3 to 5 percent by weight iron, about 0.5 percent other metals and the balance, copper. The alternate bearing material 62 was a cobalt-base material commonly termed, "stellite 1", having about 2.2 to 2.5 percent carbon, about 30 percent chromium, about 12 percent tungsten, and the balance, cobalt. Other stellite materials, such as stellite 6 and stellite 12, could likewise be utilized in one alternate set of bearing segments. The stellite bearing segments were inlaid into the cutter thrust face by means of a water-cooled oxyacetylene torch. After the stellite segments were fused into the thrust face, the remaining recessed areas were cleaned up by a blasting or a wire brush, and then the aluminum-bronze segments were fused into the alternate recess areas by heli-welding. The resulting bearing system comprises a stellite segment having a hardness in the range of 42 to 45 Rockwell C alternating with an aluminum-bronze bearing segment having a hardness in the range of 25 to 35 Rockwell C. This bearing structure is particularly advantageous in the present application because of the varied characteristics of the metallic alloys in the two different bearing segments. The stellite bearing segment enjoys very good high temperature properties, such as high hardness, low wear and low coefficient of friction at elevated temperatures, whereas the aluminum-bronze segments enjoy low wear and low coefficient of friction properties at lower temperatures.

The present trend in the design of drilling bits for drilling underground formations is to go to higher and higher skew angles and cutter axis offset in the bits to obtain more rapid and more drastic cutting, gouging and scraping action of the cutting teeth on the borehole face. For example, in co-pending application Ser. No. 132,951, filed Mar. 24, 1980, by P. W. Schumacher, a drill bit is disclosed which exhibits greatly increased offset of the cutter axes over the conventional drilling bits. In this high offset bit, tremendous additional forces are added to the thrust bearing faces arising from the increase in the offset of the axis with a resulting increase in drag on the bit. The increased drag and resultant load applied to the thrust faces tend to accelerate wear on the thrust bearing and cause early failure of the bearing surface. The increased load increases the amount of heat generated in the bearing material and raises the temperature of the bearing material sharply. This increase in temperature generally results in early bearing failure in the conventional bearing structures because of their lack of ability to function under high temperatures.

The present invention is particularly advantageous in the high offset, high drag bits because of its increased capacity to continue functioning under high loads and at high temperatures. Conversely, the present invention also offers a low temperature bearing range for operating under normal loads and stress conditions and for initial operations under high stress concentrations before temperatures have arisen from the high drag encountered. The provision of segmented composite bearings having segments formed of widely varied metal compositions provides a bearing structure of extremely wide operating range. The aluminum-bronze segments provide low coefficient of friction and low wear characteristics in the low temperature normal load range where the stellite bearing surface would normally not be as desirable. Likewise, the stellite bearing segments exhibit a decreasing coefficient of friction plug high hardness and high resistance to wear as the temperatures in the bearing structures increase. In addition to this improvement in bearing qualities with increasing temperatures, the high thermal conductivity of the aluminum-bronze further aids in dissipation of heat generated in the bearing surface away from the bearing journal shaft 18 and into the cutter 30, whereupon dissipation of the heat is achieved rather than a heat buildup which would occur if the heat were transferred the opposite direction into bearing journal 18. Thus, whereas the present disclosure illustrates a segmented thrust bearing structure in the cutter thrust face, one skilled in the art realizes that the segmented thrust bearing structure could be switched and utilized on the thrust face of the journal shaft or that both the journal shaft and the cutter could utilize the segmented bearing. The preferable construction, as previously mentioned, is to utilize the segmented bearing in the cutter face to achieve rapid heat dissipation away from the enclosed bearing shaft and into the larger and exposed cutter body.

Thus, the present invention discloses a segmented thrust bearing structure for a rolling cutter drill bit which exhibits a wide range of operating parameters and enjoys a high hardness and low coefficient friction across a broad range of operating temperatures. Although a specific preferred embodiment of the present invention has been described in the detailed description above, the description is not intended to limit the invention to the particular forms or embodiments disclosed therein, since they are to be recognized as illustrative rather than restrictive, and it will be obvious to those skilled in the art that the invention is not so limited. For example, whereas the present segmented bearing structure is disclosed comprising aluminum-bronze segments alternated with stellite segments, it is obvious that one skilled in the art could substitute other hard metals for the stellite and other bearing materials for the aluminum bronze. These and all other modifications and changes of this type are deemed to be embraced by the spirit and scope of the invention except as the same may be necessarily limited by the appended claims or reasonable equivalents thereof.

The embodiments of the invention in which an exclusive property or privilege is claimed are defined as follows:

1. In a rolling cutter drill bit of the type having at least one downwardly extending leg with a downwardly extending cantilevered bearing shaft thereon, and a rolling cutter rotatably mounted on said bearing shaft by radial bearing means and axial bearing means; the improvement comprising:
    said axial bearing means comprising a relatively flat multi-segmented thrust bearing surface;
    said multi-segmented surface having at least two segments of differing metallic compositions, one of said segments being a metal composition having low coefficient of friction at low temperatures and the other of said segment metal compositions having low coefficient of friction at high temperatures.

2. The drill bit of claim 1 wherein said low temperature metal composition comprises aluminum bronze and said high temperature metal composition comprises stellite.

3. The drill bit of claim 1 or claim 2 wherein said multi-segmented surface comprises at least four alternating segments attached to a thrust surface in said cutter.

4. The drill bit of claim 1 or claim 2 wherein said multi-segmented surface comprises at least four alternating segments attached to a thrust surface on said bearing shaft.

5. A bearing structure for use in a thrust bearing between the thrust load surfaces in a rolling cutter drill bit, said bearing structure comprising a plurality of alternating segments of at least two different metal compositions, the first of said metal compositions having desirable low temperature operating characteristics and comprising aluminum, bronze with about 15 weight percent aluminum, about 4 weight percent iron, and the remainder copper.

6. The bearing structure of claim 5 wherein the second of said metal compositions has desirable high temperature operating characteristics and comprises stellite with around 2.3 percent carbon, about 30 percent chromium, about 12 percent tungsten, and the balance cobalt.

* * * * *